May 22, 1928.
O. L. BARTLETT
SUSPENSION DEVICE
Filed Jan. 29, 1926
1,671,006
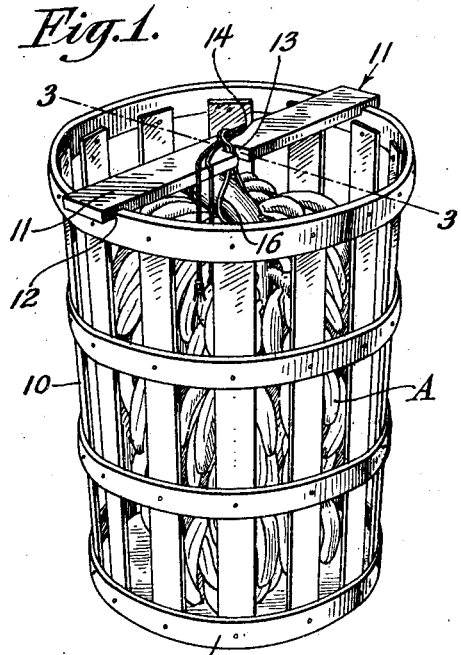
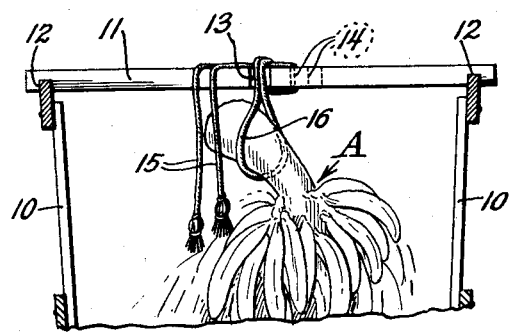
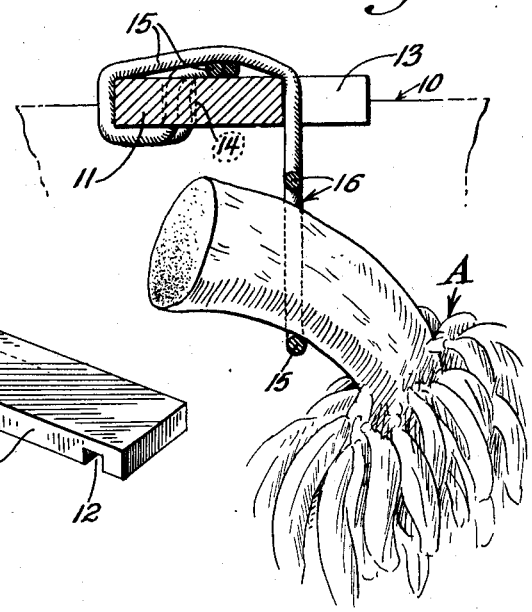
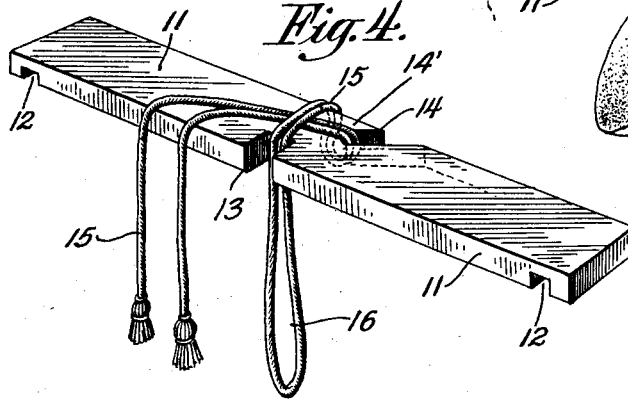
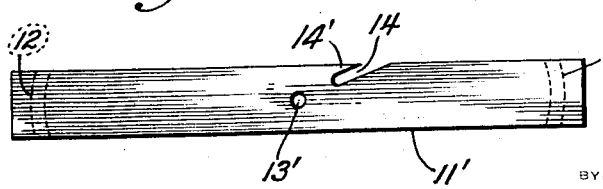
Oscar L. Bartlett
INVENTOR Patented May 22, 1928.

1,671,006

UNITED STATES PATENT OFFICE.

OSCAR L. BARTLETT, OF NEW YORK, N. Y.

SUSPENSION DEVICE.

Application filed January 29, 1926. Serial No. 84,714.

This invention relates to improvements in suspension devices and has particular reference to a suspension cleat for the purpose of supporting a stalk of bananas within a hamper or other container.

The primary object of the invention resides in a suspension device for attachment to the peripheral edge of a container for the purpose of suspending a stalk of bananas therein whereby the bananas may be kept free of the sides of the container, as it will be appreciated that contact with the sides during shipment will cause the fruit to be bruised.

Another object of the invention is to provide a simple and efficient means for suspending a stalk of bananas within a container which comprises a single length of wood or other material which is cut in such a novel manner as to receive and lock a suspending element thereto.

With these and other objects in view, the invention resides in certain novel construction and combination and arrangement of parts, the essential features of which are hereinafter fully described, are particularly pointed out in the appended claim, and are illustrated in the accompanying drawings, in which:

Figure 1 is a perspective view of my suspending cleat in position upon a hamper.

Figure 2 is a vertical section therethrough.

Figure 3 is a transverse section on the line 3—3 of Figure 1.

Figure 4 is a detail perspective view of the suspending cleat per se.

Figure 5 is a plan view of a modified form of my invention.

Referring more particularly to the drawing, the reference numeral 10 designates an ordinary shipping hamper or other like container and to which my suspending cleat 11, shown in its entirety, is applied. The suspending cleat is constructed of a single length of material, and preferably wood, of such a length as to bridge the container at diametrically opposite points on the peripheral edge thereof. In order that the device may be properly seated upon the hamper, I provide notches 12 adjacent opposite ends of the same and which notches open onto one of the faces of the cleat. A notch 13 is provided in one of the longitudinal edges of the cleat midway between the ends of the same, while the opposite edge is provided with a notch 14 which is cut at an acute angle with respect to the longitudinal edge of the device to provide a slot and finger 14' for the purpose now to be explained.

Used in conjunction with the cleat above described, is a length of flexible cord or rope 15, and when assembling the device for use, the cleat is held in the hands of the operator with the edge of the cleat having the notch nearest him, whereupon the cord or flexible element is held so that the free ends of the cord terminate adjacent each other, thus forming a loop in the length of cord. The double thickness of the rope or cord is inserted in the notch 14, and at this time, the loop 16 may be adjusted as to length, depending upon the length of the stalk of bananas to be suspended. After inserting the cord in the notch 14, the device is turned completely around so that the two leads of the cord pass about the finger 14' and overlap the free ends of the same, at which time, the two leads of the cord are seated in the notch 13, from where the loop depends for the reception of the end of the stalk of bananas. Although I have mentioned one way of causing the clamping of the free ends of the cord, it will be appreciated that the cord may be applied in a different manner for suspension, so long as the looped end of the cord overlaps the free ends of the same and prevents slipping of the loop. Having formed the depending loop 16, the end of the stalk of bananas A may be inserted in the loop and it will be noted that the heavier the load suspended from the loop, the tighter will be the gripping action between the free ends of the same cord and the overlying portions of the same. The stalk of bananas may now be placed within the hamper 10, by seating the cleat upon the peripheral edge of the hamper as clearly shown in Figure 1 of the drawing. When in position, the stalk of bananas is freely suspended within the hamper so as not to touch the sides or bottom of the same, and if desired suitable packing material, such as excelsior or the like, may be packed between the walls of the hamper and the stalk of bananas.

In addition to serving the function of holding the leads of the flexible element together, the notch 13 causes the pull which is exerted from the load carried thereby to be disposed adjacent the center of gravity of the cleat. It will be appreciated that if the flexible member merely passed over the longitudinal edge of the cleat, the pull would tend to turn or upset the cleat when set in position upon a support.

In Figure 5 of the drawing, I have shown a slightly modified form of suspension cleat 11', which is similar to the preferred form, with the exception that the notch 13 is dispensed with and an opening 13' substituted therefor, and which is disposed approximately central of the cleat. Instead of attaching the suspending member in the manner desscribed in the preferred form, the looped portion of the cord is dropped through the opening, and the cord inserted in the notch 14 in such a manner that the free ends are securely clamped in a manner similar to that shown in the preferred form.

Although I have specifically mentioned the device for use in suspending bananas, it will be appreciated that other food commodities may be suspended therefrom, and if desired, the cleat may be of such length as to support a plurality of food stuffs such as hams and the like for display purposes.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention, limited only by the appended claim.

What is claimed as new is:—

A suspension device comprising a cleat having suitable spaced notches therein along their longitudinal side edges, the same being disposed out of alignment with each other, a length of cord having its ends brought together to provide a loop, the two leads of said cord being received in said notches so that a portion of said cord overlies the free end portions of the same for gripping the same, while the loop portion depends therefrom to receive an object to be suspended, whereby the heavier the object, the greater will be the gripping engagement between the overlying portions of said cord and the free ends of the same.

In testimoney whereof I have affixed my signature.

OSCAR L. BARTLETT.